United States Patent [19]

Blanton et al.

[11] Patent Number: 5,132,520

[45] Date of Patent: Jul. 21, 1992

[54] CABINET FOR STORAGE OF HEATED FOODS

[76] Inventors: Robert L. Blanton, 850 E. Arcadia Lakes Rd., Columbia, S.C. 29206; Ted Y. Prosalenti, 6219 Old Leesburg Rd., Hopkins, S.C. 29061; Jeffrey A. Wilson, Rte. 1, Box 184A, Eastover, S.C. 29044

[21] Appl. No.: 714,649

[22] Filed: Jun. 13, 1991

[51] Int. Cl.⁵ .............................................. F27B 9/10
[52] U.S. Cl. ................................. 219/400; 126/21 A
[58] Field of Search .............. 219/400, 401; 392/399; 126/21 A, 21 R

[56] References Cited

U.S. PATENT DOCUMENTS

| | | | |
|---|---|---|---|
| 2,636,969 | 4/1953 | Lewis | 219/19 |
| 3,517,605 | 6/1970 | Hursch et al. | 99/423 |
| 3,545,832 | 12/1970 | Levenback | 219/400 |
| 3,712,207 | 1/1973 | McGinley et al. | 99/349 |
| 3,942,426 | 3/1976 | Binks | 219/400 |
| 4,261,257 | 4/1981 | Henderson et al. | 99/386 |
| 4,363,955 | 12/1982 | Gauthier | 219/388 |
| 4,437,396 | 3/1984 | Plattner | 219/400 |
| 4,530,276 | 7/1985 | Miller | 99/386 |
| 4,668,854 | 5/1987 | Swan | 392/399 |
| 4,722,268 | 2/1988 | Rightley | 219/401 |
| 4,803,921 | 2/1989 | Nuss | 99/483 |
| 4,835,368 | 5/1989 | Fortmann et al. | 219/401 |
| 4,891,498 | 1/1990 | Fortmann | 219/401 |
| 4,924,072 | 5/1990 | Oslin | 219/400 |
| 4,939,987 | 7/1990 | Smith | 219/401 |

Primary Examiner—Teresa J. Walberg
Attorney, Agent, or Firm—Michael A. Mann

[57] ABSTRACT

A food storage cabinet, preferably with a food toaster mounted thereon, for storing toasted foods in a heated, humidified state. The cabinet has an upper chamber and a lower chamber with supply and return ducts connecting the atmospheres of the two chambers. Heat and humidity sensors in the return duct emit signals to a controller indicative of the temperature and humidity in the upper chamber, where food is stored, so that the temperature and humidity can be regulated and maintained against a specified temperature and humidity. Additional heat for the upper chamber is generated by a strip heater attached to the ceiling of the lower chamber, providing heat and also evaporating condensate forming on the floor of the upper chamber. Additional humidity is provided by a spray of a water mist onto a heating element in the lower chamber. A slightly angled door in the top of the upper chamber allows access to stored foods and rolls shut when not being held open. Toasted foods pass from the toaster through baffles to the upper chamber, the baffles keeping heated air from exiting the upper chamber through the toaster.

21 Claims, 3 Drawing Sheets

CABINET FOR STORAGE OF HEATED FOODS

BACKGROUND OF THE INVENTION

1. Field of the Invention

The present invention relates to food storage cabinets. More particularly, the present invention relates to cabinets for receiving and holding cooked foods in a heated and humidified environment for serving.

2. Discussion of Background

Food storage cabinets and steamers are well known. Keeping hot foods hot and moist until served is an objective of several patented devices. However, when access to the cabinet is needed on an irregular basis and when the temperature and humity of the air surrounding the cabinet is changing constantly, temperature and humidity control can be difficult.

Pinnow, et al. disclose, in U.S. Pat. No. 4,853,368 and its continuation-in-part U.S. Pat. No. 4,891,498, a cabinet using metered pulses of water of preselected duration and interval onto a heated surface to control humidity in a food storage cabinet. The pulsing is reset by a switch activated by the opening of an access door so that one or more charges of water vapor can compensate for the loss of vapor to the atmosphere through the opening. However, such an apparatus does not regulate humidity directly, that is, by measuring the humidity and then changing the humidity of the cabinet to meet a specified humidity level, and it fails to take into account factors affecting humidity that can change relatively quickly over the course of a few hours or even minutes. Without frequent, external adjustment to the controls, the humidity in such a cabinet can depart significantly from an appropriate level.

Pinnow, et al. provide water vapor for humidification by delivering water to a cast heating element which vaporizes the water. The apparatus disclosed by Rightly (U.S. Pat. No. 4,772,268) is a food warming cabinet that controls both humidity and temperature and circulates warm, moist air through channels in the sides of the cabinet. Rightley stores food in an upper chamber and generates the warm, moist air in a lower one. Plattner, et al. (U.S. Pat. No. 4,437,396) teach an air-heated sandwich bin that blows humidified air across "always open" access ports, creating a dome of warm, moist air. Rightley and Platner, et al., humidify with a water pan with an immersion heater in it.

There is a need for a food storage cabinet that closely regulates the heat and humidity about a certain specified temperature and humidity responsively and regardless of the number of times and duration of the time the cabinet door is opened or heated food is introduction to the cabinet interior and in spite of changing environmental conditions, and preferably a storage cabinet that receives the toasted or cooked foods directly before they have a change to cool.

SUMMARY OF THE INVENTION

According to its major aspects and broadly stated, the present invention is an apparatus for storing food in a heated, humidified environment. The apparatus is an insulated cabinet or bin having an interior dimensioned for storing a quantity of food, preferably in an upper chamber. There is an opening in the top of the upper chamber and a sliding or rolling door covers the opening when the door is in a closed position. Humidity and temperature sensors detect the relative humidity and temperature and issue signals indicative of the humidity and temperature in the upper chamber. The signals are received by a controller that regulates and maintains the temperature and humidity against a specified temperature and humidity, increasing either as required to keep the temperature within about four degrees Fahrenheit and the humidity to within about three percent relative humidity. The air is heated in response to the controller by a strip heater on the ceiling of a lower chamber; the humidity is increased by spraying a water mist onto a heated surface whereby the water mist is vaporized.

A toaster or other food cooking device is attached on the top of the cabinet so that it can pass toasted food through an opening to the upper chamber through baffles that prevent air from passing out of the upper chamber.

An important feature of the present invention is the direct regulation of humidity. The controller receives the outputs from the humidity sensor in the return duct and causes the humidity to rise if it is not close enough to the specified humidity. By regulating humidity directly, the various factors that affect humidity—relative humidity of the ambient air, temperature of the ambient air, humidity introduced with the heated food entering the upper chamber, the number of times and duration of the times food is taken out of the upper chamber—are all taken into account.

Another important feature of the present invention is the system for preventing the escape of moist warm air from the upper chamber notwithstanding the need for food to enter and leave the upper chamber. There are two openings from which warm, moist air from the upper chamber can escape: a first opening for allowing access to food stored in the upper chamber and a second opening to receive food from the toaster. The first opening is normally covered with a sliding door, oriented generally in a horizontal position on top of the cabinet, for the convenience of those accessing the interior of the cabinet, but with a slight angle so that the door slides shut when not held open. Also, air inside the upper chamber is directed passed and parallel to the first opening so as to create a curtain of air transverse to the opening to minimize flow perpendicular to and out of the opening. Air escape from the upper chamber into the toaster is prevented by a baffle that parts to allows food to drop through but closes immediately thereafter.

Still another important feature of the present invention is the method for generating humidity. Water is sprayed as a mist onto a surface to a temperature sufficient to vaporize water rather than in the form of a jet of water. Because the water is in the form of a mist, it vaporizes much more quickly, does not spatter, and thus the response time to a demand for higher humidity is shorter.

Another important feature of the present invention is the method for supplying heat to the upper chamber. A strip heater attached to the ceiling of the lower chamber heat the floor of the upper chamber for keeping the food warm and also evaporating any condensate that forms on the floor of the upper chamber.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 2 is a cross sectional view of the cabinet of FIG. 1 taken along lines 2—2;

DETAILED DESCRIPTION OF A PREFERRED EMBODIMENT

Figure 1:
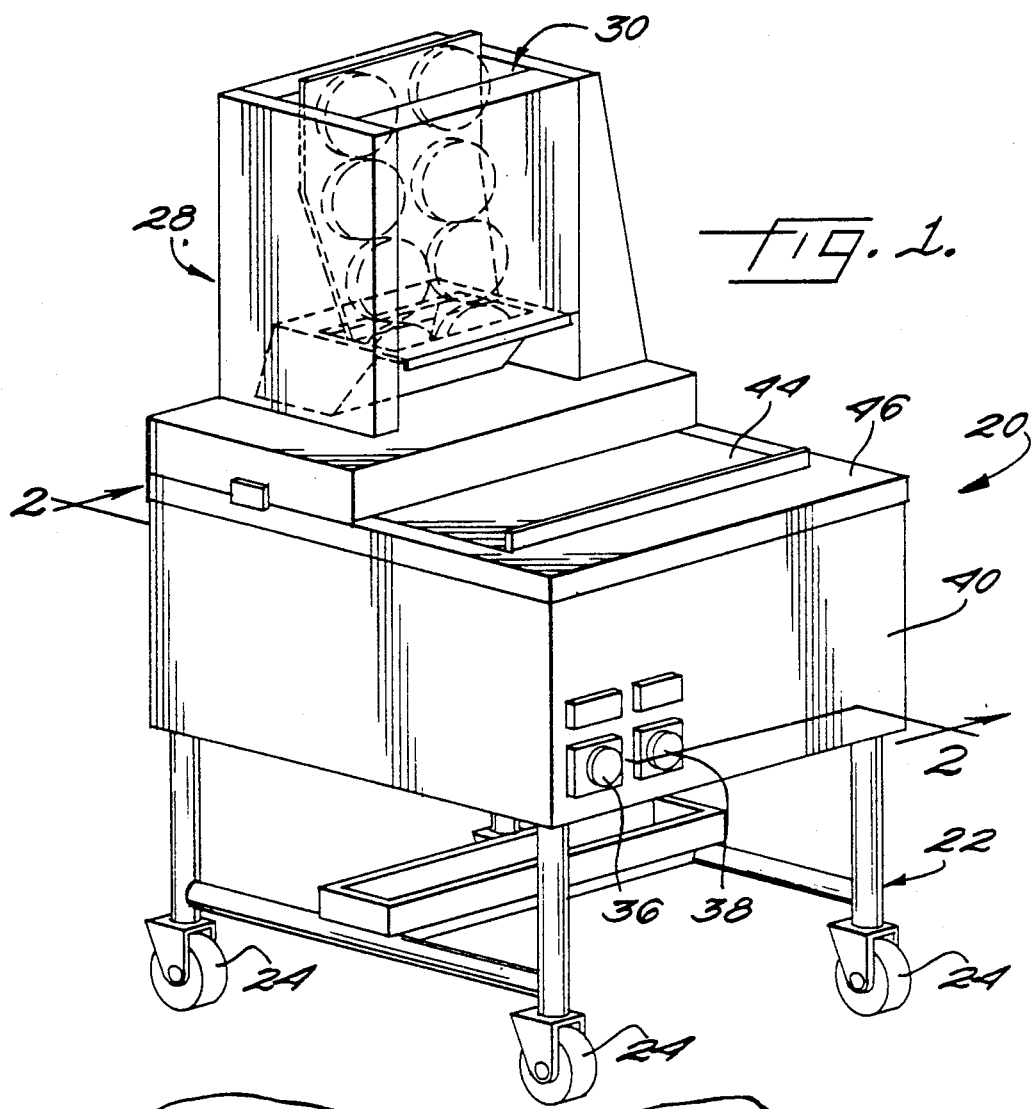
FIG. 1 is a perspective view of a cabinet according to a preferred embodiment of the present invention.

Referring now to FIG. 1, there is illustrated a preferred embodiment of a cabinet 20 according to the present invention. The cabinet is generally rectangular, raised above the floor by a frame 22 and preferably made mobile by a set of castors 24. The cabinet is made of stainless steel for washability as well as corrosion resistance.

Mounted to the top of cabinet 20 is a toaster 28, as illustrated, or some other food cooking device such as a microwave, convection or conventional oven. Toaster 28 heats or cooks foods such as bread, buns, muffins, biscuits, meat patties, and the like, which are fed into a hopper 30 at the top entrance of toaster and moved downward by a conveyor 32, as is well known in commercial toasters, to apply the requisite heat for the proper length of time to achieve complete cooking.

Figure 3:
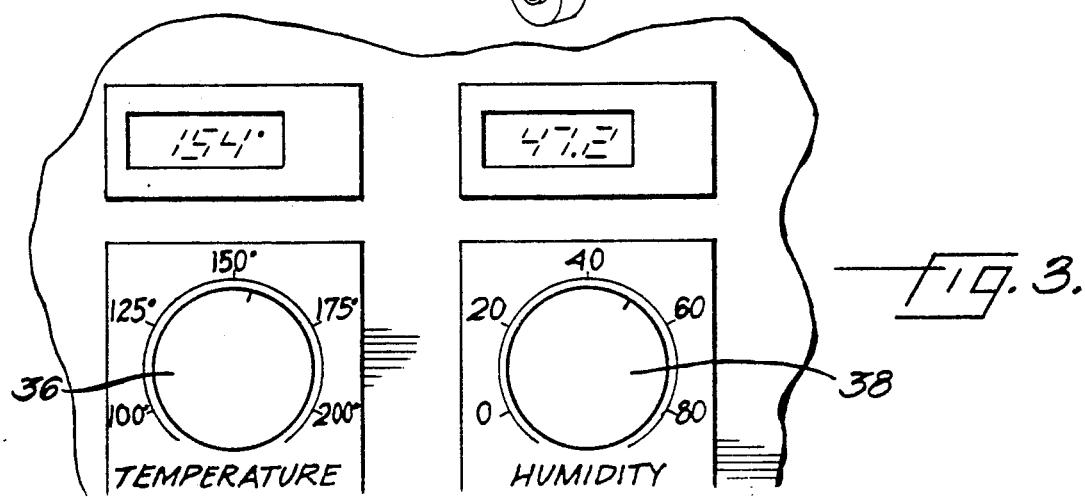
FIG. 3 is a detail of the front of the cabinet of FIG. 1 showing the instrumentation controls.
Figure 5:
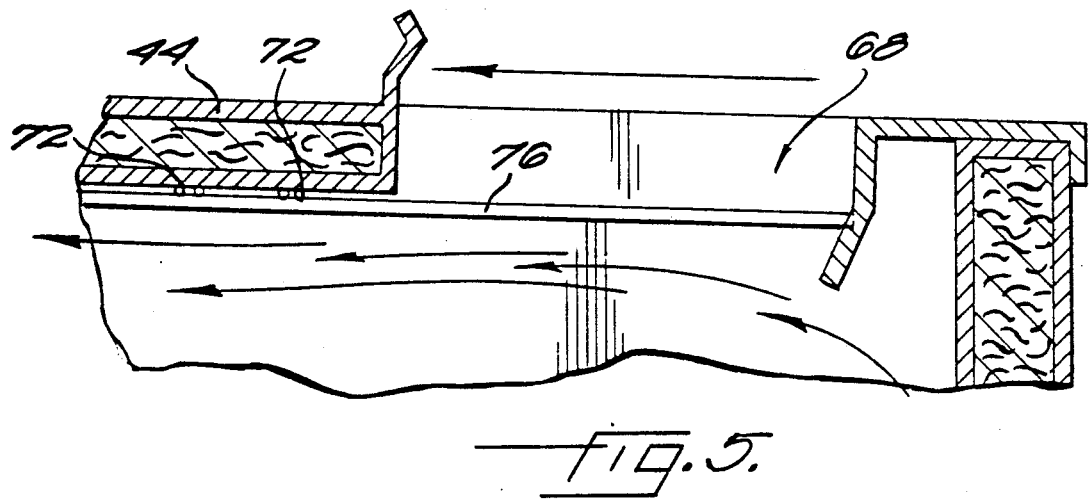
FIG. 5 is a detailed cross sectional view of the access door according to a preferred embodiment of the present invention.

Controls for temperature 36 and humidity 38 are on the front 40 of cabinet 20 (FIGS. 1 and 3) and an access door 44 (FIGS. 1, 2 and 5) is located on the top 46 of cabinet 20 forward of toaster 28.

FIG. 2 is a cross sectional view of cabinet 20 and toaster 28 of FIG. 1 taken along lines 2—2. Cabinet 20 is seen to be a hollow bin with insulation 42 between its inner wall 48 and outer wall 50. The interior of cabinet 20 has an upper chamber 54 and a lower chamber 56. Upper chamber 54 is for the storage of food; lower chamber 56 is for the production of water vapor for humidification and holds the heaters, as will be described presently.

Above upper chamber 54 is toaster 28 with hopper 30 and two continuous tracts 60 for conveying food past toasting elements (not shown) and into an opening 62 communicating with upper chamber 54. At opening 62 is a baffle 64 comprising two sheets 66 of a flexible, resilient, heat-resistant material, such as TEFLON, curved to resist upward movement but flexible and resilient enough to permit the food items from dropping to upper chamber 54 without significant resistance. Baffle 64 thus prevents the upward current of heat from upper chamber 54 (or the downward radiation of heat from toaster heating elements to further heat and perhaps dry food in upper chamber).

Forward of opening 62 is access door 44 (FIGS. 2 and 5) and a second opening 68 for enabling access to upper chamber 54. Access door 44 has an opened position (FIG. 5) and a closed position (FIG. 2). Door 44 covers opening when in the closed position. Door 44 is preferably of the type that slides into a recess 70 in the top of cabinet 20, garage door-like, and has rollers 72 that engage rails 76 in cabinet top. Door 44 is also angled slightly from a horizontal position so that, unless held open, door 44 rolls slowly to the closed position. Door 44 is preferably positioned on top of cabinet 20 so that food servers and preparers, standing, can easily see food inside without bending and can load food to be cooked by toaster 28 without stretching. Having a self-closing door 44 prevents door 44 from being left open when servers and preparers are busy and preoccupied. A slowly closing door 44 allows someone to obtain the number of food items needed before door 44 closes but without having to hold the door open.

Food entering upper chamber 54 from toaster 28 through opening falls to an inclined rack 78 and slides forward toward opening 68 for use, so that the first foods toasted are the first ones used so that no foods reside an especially long time in upper chamber 54.

In lower chamber 56, there is a catch basin 80 with a drain 84 to an outside trough 86 so that condensate in the lower chamber 56 is removed quickly. There is a heating unit 88 and a nozzle 92 poised above it, as will be described in more detail presently, for production of water vapor. A second heating element 94 is attached to the ceiling 96 of lower chamber 56, which is the floor of upper chamber 54, which warms the floor of upper chamber 54 thereby producing heat for maintaining the temperature in upper chamber 54, and for evaporating any condensate forming on the floor of upper chamber 54. Heating element 94 is preferably a resistance-type strip heater of an aluminum foil with heating elements on the inside for fast and accurate response to demands for heat.

Toward the rear of cabinet 20 is an electric motor 100 driving a blower 102 for circulating air between upper and lower chambers 54, 56. Air is drawn from upper chamber 54 at the rear of cabinet 20 through a return duct 104, then driven across lower chamber 56 and up supply duct 108 to upper chamber 54, across the inside top of upper chamber 54, passed and parallel to opening 68, then down return duct 104 to lower chamber 56. The air from the lower chamber 56 thus mixes with any air from toaster 28 incident to the introduction of additional food and picking up any radiated heating after being directed as an air curtain across opening. By using the air as an air curtain (see also FIG. 5), updrafts from upper chamber 54 through opening when access door 44 is opened are greatly reduced. All the components internal to cabinet 20, including return and supply ducts 104, 108 are preferably removable for cleaning and maintenance.

Control of humidity and temperature begins with solid state electronic sensors 110 located in supply duct 108. Solid state sensors 110, sensitive to changes in temperature and adsorbed moisture and well known to those of ordinary skill in the electronic sensor art, such as those manufactured by Watlow, Inc., provide outputs to a controller 112 that regulates and maintains the temperature and humidity in the upper chamber 54. These output signals are indicative of the temperature and humidity in the upper chamber 54 and are compared by the controller 112 to specified temperature and relative humidity set by the user. Preferably, for toasted hamburger buns, a temperature of 155°±4° F. and a relative humidity of 50% ±3% assures a satisfactory storage environment. Controls (FIG. 3) are thus set to the specified temperature and relative humidity and are held there, or a little more, a little less, by controller 112.

If the humidity drops below the specified humidity, a water mist is sprayed from nozzle 92 to heating unit 88

Figure 4:
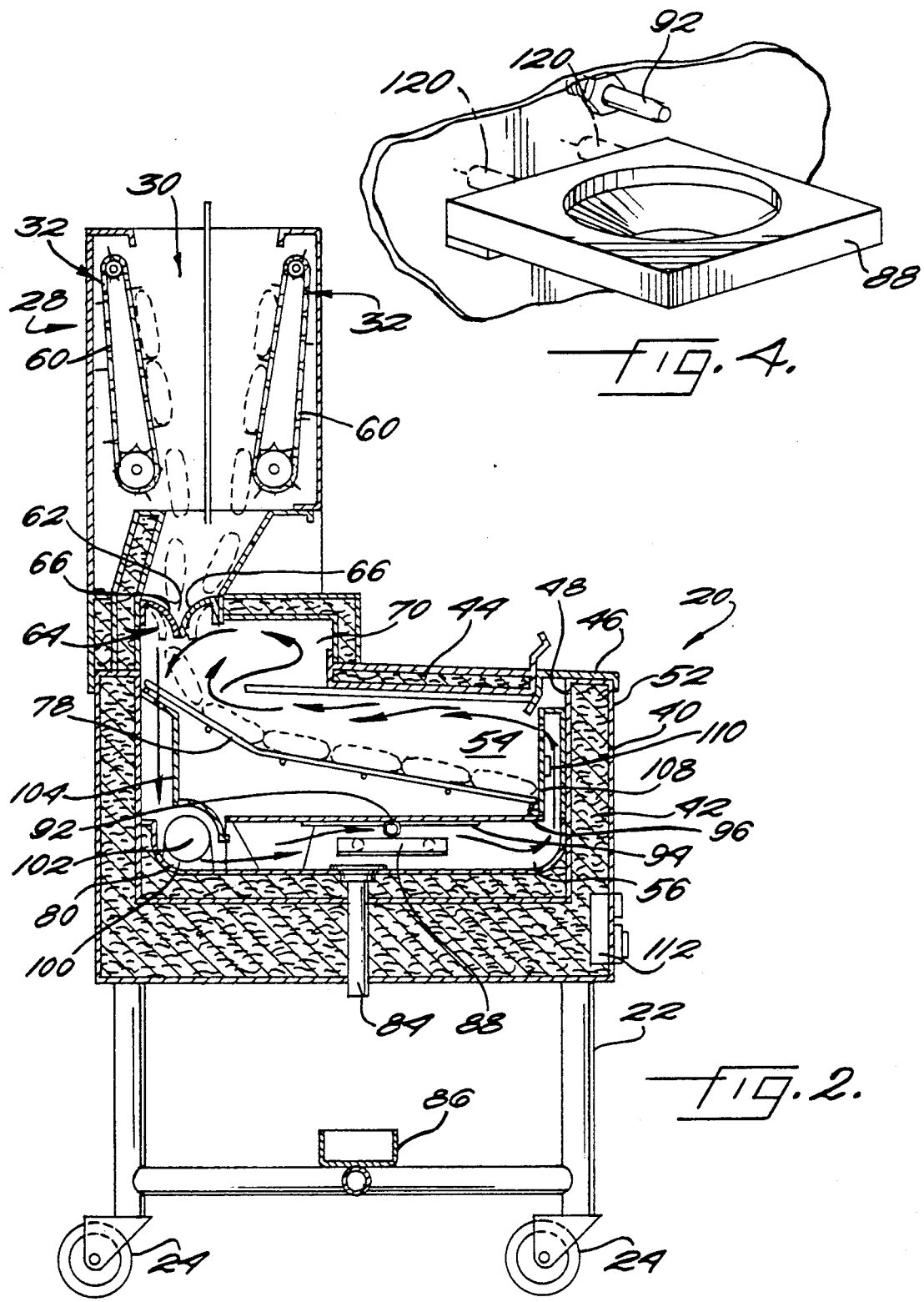
FIG. 4 is a perspective view of a the humidifier according to a preferred embodiment of the present invention.
Figure 6:
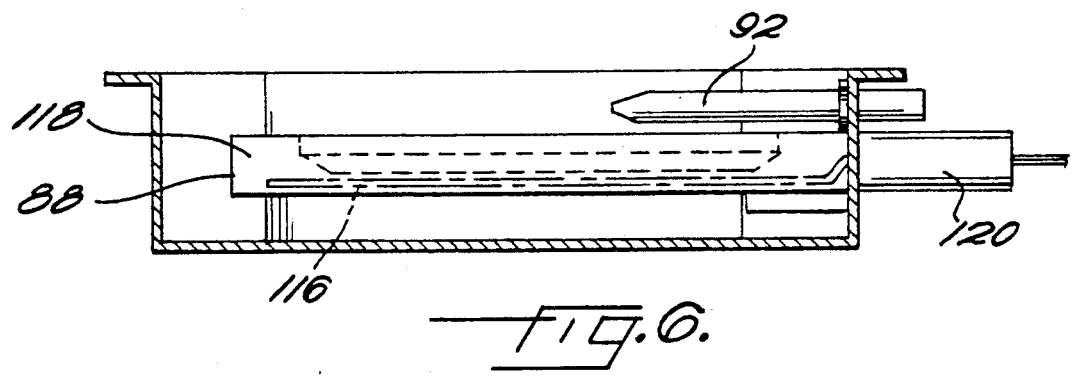
FIG. 6 is a side view of the humidifier shown in FIG. 4.

(see FIGS. 4 and 6). Heating unit 88 comprises a platinum heating element 116 in a cast aluminum alloy matrix 118. The ends 120 of the platinum element 116 are connected to a source of electricity. Heating unit 88 is maintained very closely to a temperature of 265° F., a temperature sufficiently high to assure the vaporization of the mist. Water is directed to the heating unit 88 as a mist rather than poured, squirted or delivered as a plug of water so that it is vaporized more quickly and does not spatter. Thus, additional water vapor is very quickly delivered to the atmosphere of cabinet 20 and circulated to upper chamber 54.

Controller 112 receives the output from temperature sensor 110 and changes the temperature of strip heater accordingly. Strip heater 94 will vary in temperature from 180° to 190° F.

It will be appreciated by those skilled in the art that the present cabinet 20 provides an upper chamber 54 for the storage of food in a closely controlled temperature and humidity environment. Heat and moisture do not readily escape to toaster 28 because of baffle 64 or through opening 68 because of the air curtain and the self-closing door 44. Temperature and humidity of the upper chamber 54 are directly controlled by separating storage area from the humidity production area, by measuring temperature and humidity in the supply duct 108 rather than near the toaster 28 and return duct 104, by providing humidification and heat generation systems that are responsive, and by removing condensate from lower chamber 56 quickly so that it does not interfere with the controlled production of humidity. Further, by attaching toaster 28 to the top of cabinet 20, there is no possibility for the food to cool or dry before being place into upper chamber 54.

In use, the specified temperature and humidity are set using controls 36, 38 on front 40 of cabinet 20. Then, food is placed into hopper 30 where it is conveyed downwardly, passed heating elements of toaster 28 that toast the food. The toasted food drops through baffle 64 that allows the food to pass but closes immediately thereafter to prevent the warm, moist air of upper chamber 54 from exiting through toaster 28. The food slides forward on rack 78 until a server or food preparer slides access door 44 open and removes food through opening 68. Access door 44 slowly rolls closed. A curtain of the warm moist air passes across and parallel to opening 68 limiting the loss of air therethrough. The air then passes through return duct 104. The temperature and relative humidity are sensed in supply duct 108 and reported electronically to controller 112. If the temperature and humidity indicated for the upper chamber 54 depart from the specified temperature and humidity, a strip heater 94 on the ceiling 96 of the lower chamber 56 will become hotter to warm the floor of upper chamber 54, and nozzle 92 connected to a water supply will spray a water mist onto a heating unit 88, flashing the mist to vapor for circulation via a supply duct 108 to the upper chamber 54.

It will be apparent to those skilled in the art that many changes and substitutions can be made to the preferred embodiment herein described without separting from the spirit and scope of the present invention as defined by the appended claims.

What is claimed is:

1. An apparatus for storing food, said apparatus comprising:
    a bin having an interior dimensioned for storing a quantity of said food, said bin having a first opening formed therein for allowing access to said interior, said bin having a top;
    means in said bin for drawing air across and parallel to said first opening;
    an access door carried by said bin and adapted for covering said first opening, said access door having an open position and a closed position, said access door covering said opening when in said closed position, said access door carried by said top, said access door having means incorporated therein for rolling said door and said opening being angled so that said access door rolls from said open position to said closed position unless held in said opened position;
    a humidity sensor carried by said bin for sensing humidity, said humidity sensor producing a first output indicative of said humidity in said interior;
    a temperature sensor carried by said bin for sensing temperature, said temperature sensor producing a second output indicative of said temperature in said interior;
    means for heating air in the interior of said bin;
    means for humidifying said air in the interior of said bin; and
    controller means for receiving said first and said second outputs and for regulating the temperature and the humidity of said interior of said bin by activating said heating and said humidifying means, said controller having a specified temperature and a specified humidity, said controller regulating the temperature and the humidity in said interior about said specified temperature and specified humidity, respectively.

2. The apparatus as recited in claim 1, wherein said controller regulates said temperature to within four degrees of said specified temperature and said relative humidity to within three precent of said specified humidity.

3. The apparatus as recited in claim 1, wherein said humidifying means further comprises:
    a surface heated to a temperature sufficient to vaporize water; and
    means for spraying a water mist onto said surface, whereby said water mist flashes to water vapor.

4. The apparatus as recited in claim 1, further comprising:
    a second opening for receiving said quantity of food into said interior; and
    means for urging said food in said interior toward said first opening.

5. The apparatus as recited in claim 1, wherein said specified temperature is approximately 155° F. and said specified humidity is approximately 50% relative humidity.

6. A cabinet for storing heated food, said cabinet comprising:
    a storing chamber having an interior dimensioned for storing a quantity of food, said storing chamber having a first opening formed therein for enabling access to said interior;
    a heating chamber, said heating chamber being in fluid communication with said storing chamber;
    means for covering said first opening of said storing chamber, said covering means having an opened position and a closed position, said covering means covering said opening when in said closed position;
    means for maintaining the temperature of said storing chamber at a specified temperature;

means for maintaining the humidity of said storing chamber at a specified humidity;

a second opening formed in said cabinet for receiving heated food;

means for moving said food in said storing chamber toward said first opening from said second opening; and food cooking means attached to said cabinet so that said food can pass from said food cooking means to said storing chamber through said second opening.

7. The cabinet as recited in claim 6, further comprising a baffle covering said second opening so that air from said storing chamber is blocked from passing to said cooking means but food from said cooking means can pass to said storing chamber.

8. The cabinet as recited in claim 6, wherein said covering means further comprises:
   an access door;
   means formed in said storing chamber proximate to said opening for slidably carrying said access door, said access door sliding between said open position and said closed position.

9. The cabinet as recited in claim 8, wherein said access door has means formed therein for rolling said access door, said rolling means engaging said carrying means, said access door formed in said cabinet at an angle so that said access door slides to said closed position when not held in said opened position.

10. The cabinet as recited in claim 6, wherein said storing chamber has a top and said first opening is formed in said top.

11. The cabinet as recited in claim 10, wherein said storing chamber has means for drawing heated, humid air across and parallel to said first opening.

12. A cabinet for storing heated food, said cabinet comprising:
   an upper chamber having a top, first opening and a floor;
   an access door carried by said top, said access door having an opened position and a closed position, said door covering said first opening when in said closed position;
   a lower chamber below said upper chamber, said floor of said upper chamber being the ceiling of said lower chamber;
   conduit means for circulating air between said upper and said lower chambers;
   means for moving air between said upper and said lower chambers;
   means for heating air, said heating means being in said lower chamber;
   means for humidifying air, said humidifying means being in said lower chamber;
   a humidity sensor carried by said cabinet for sensing humidity, said humidity sensor producing a first output indicative of said humidity in said upper chamber;
   a temperature sensor carried by said cabinet for sensing temperature, said temperature sensor producing a second output indicative of said temperature in said upper chamber;
   controller means for receiving said first and said second outputs and for regulating the air and the humidity in said upper chamber, said controller means having a specified temperature and a specified humidity and regulating said temperature and said humidity about said specified temperature and humidity, respectively.

13. The cabinet as recited in claim 12, wherein said conduit means further comprises a supply duct and a return duct, said supply duct carrying air from said lower chamber to said upper chamber, said return duct carrying air from said upper chamber to said lower chamber, and wherein said humidity and said temperature sensors are positioned in said return duct.

14. The cabinet as recited in claim 12, wherein said humidifying means further comprises:
   a heating element heated to a temperature sufficient to vaporize water; and
   a nozzle for spraying a water mist onto said heating element whereby said mist vaporizes.

15. The cabinet as recited in claim 12, wherein said moving means moves said air across and parallel to said first opening to limit movement of air through said opening when said access door is in said opened position.

16. The cabinet as recited in claim 12, wherein said controller maintains said temperature to within four degrees of said specified temperature and to within three percent of said specified humidity.

17. The cabinet as recited in claim 12, wherein said specified humidity is approximately 50% relative humidity and said specified temperature is approximately 155° F.

18. The cabinet as recited in claim 12, wherein said upper chamber has a second opening formed therein and further comprising means for toasting said food, said toasting means positioned above said upper chamber so that said toasted food can pass to said upper chamber from said tasting means through said second opening.

19. The cabinet as recited in claim 18, further comprising a baffle between said toaster means and said upper chamber to prevent air from passing to said toaster means from said upper chamber but allow said toasted food to pass to said upper chamber from said toaster means.

20. The cabinet as recited in claim 12, wherein said heating means further comprises a heater attached to said ceiling of said lower chamber for heating said upper chamber and for vaporizing any condensate forming on said floor of said upper chamber.

21. The cabinet as recited in claim 12, further comprising means formed in said lower chamber for draining any condensate forming in said lower chamber out of said lower chamber.

* * * * *